Dec. 11, 1951      L. FOSTER      2,577,745
CUTTER FOR SOLID CARBON DIOXIDE
Filed Nov. 19, 1948      2 SHEETS—SHEET 1
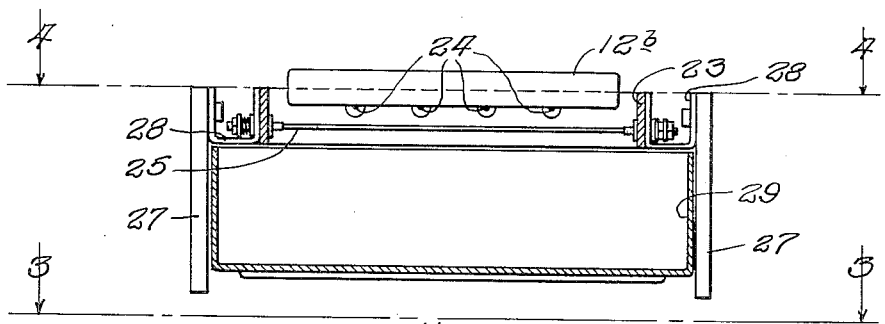
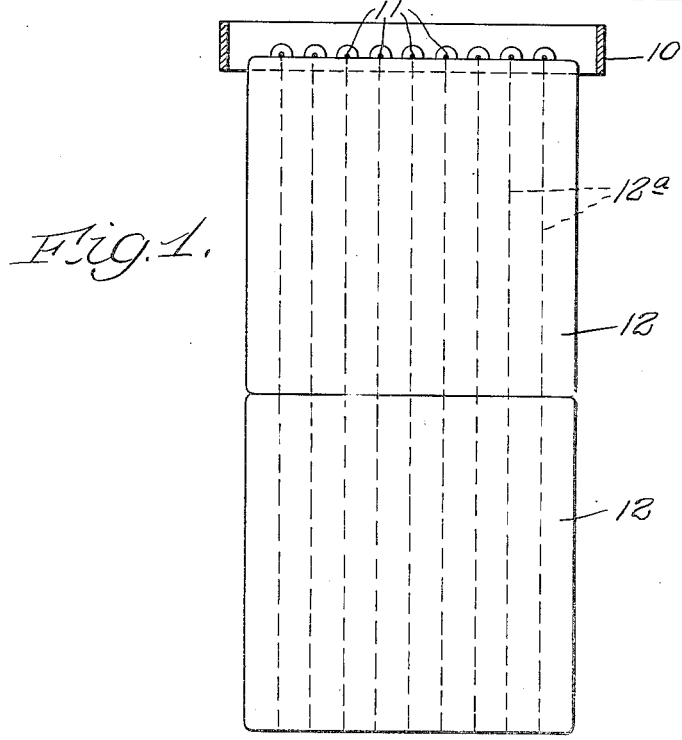
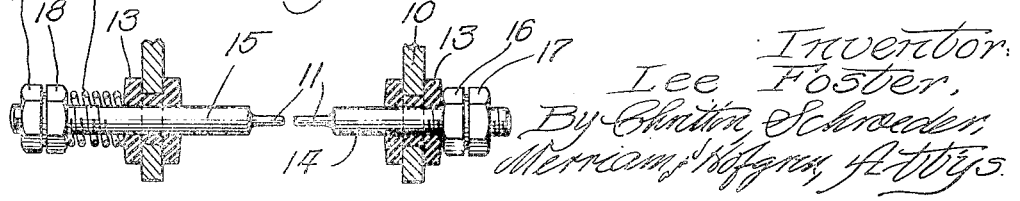

Dec. 11, 1951     L. FOSTER     2,577,745
CUTTER FOR SOLID CARBON DIOXIDE

Filed Nov. 19, 1948     2 SHEETS—SHEET 2

Inventor
Lee Foster

Patented Dec. 11, 1951

2,577,745

UNITED STATES PATENT OFFICE 2,577,745

CUTTER FOR SOLID CARBON DIOXIDE

Lee Foster, Berwyn, Ill.

Application November 19, 1948, Serial No. 60,978

3 Claims. (Cl. 219—19)

This invention relates to a cutter for cutting relatively large masses of solid carbon dioxide into smaller pieces.

Solid carbon dioxide, commonly known as Dry Ice, is finding increasing use as a refrigerating medium. This is particularly true in the ice cream industry where the material is used to maintain the ice cream in frozen condition. As the solid carbon dioxide is ordinarily manufactured in relatively large blocks, most of which are cubes about 10 inches on an edge and weigh approximately fifty pounds, it is necessary that these blocks be cut in small pieces. In the past the solid carbon dioxide has ordinarily been cut with saws. This method is not entirely satisfactory, however, as there is considerable wastage and it is difficult to guide the solid carbon dioxide during the cutting. Furthermore, cutting solid carbon dioxide with a saw is slow, laborious and dangerous.

I have found that solid carbon dioxide may be conveniently cut with a cutter comprising a substantially rigid frame, a plurality of heavy electric resistance conductors such as wires arranged across the frame and insulated therefrom together with means for maintaining the wires taut. This means preferably comprises a spring means for each wire that permits the required expansion and contraction of the wire during temperature changes therein, but maintains an approximately constant tension on the wire.

Figure 4:
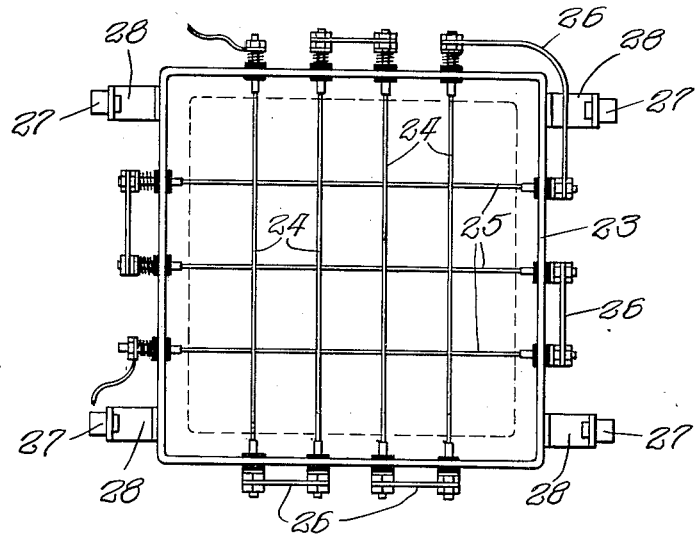
Figure 3:
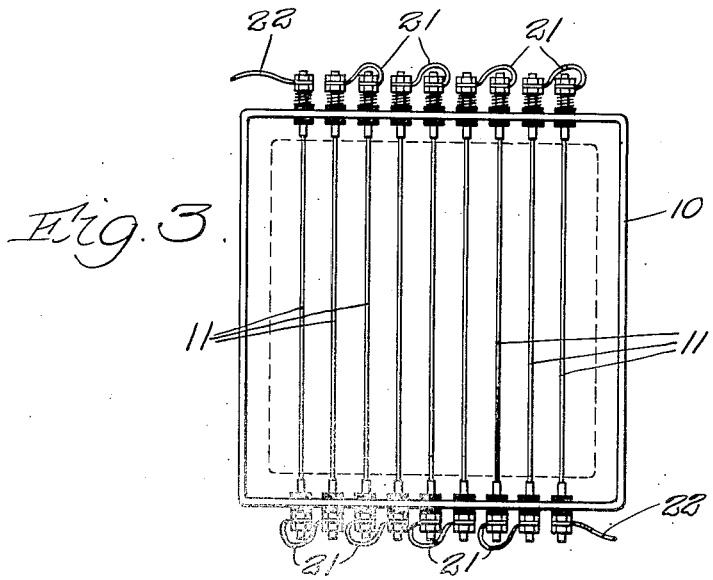

The invention will be described as related to the embodiment shown in the accompanying drawings. Of the drawings: Fig. 1 is a vertical sectional elevation of a cutter and showing a mass of solid carbon dioxide in position for being cut into slabs; Fig. 2 is a vertical sectional elevation showing a slab being cut into cubes; Fig. 3 is a plan view of the cutter of Fig. 1; Fig. 4 is a plan view of the cutter of Fig. 2; and Fig. 5 is an enlarged broken elevation of one resistance wire and its mounting with the portion of the frame adjacent said mounting being shown in section.

Figs. 1 and 3 of the drawings illustrate one embodiment of a cutter for cutting blocks of solid carbon dioxide into slabs. Figs. 2 and 4 illustrate an embodiment of the invention wherein a slab is cut into cubes.

The cutter shown in Figs. 1 and 3 comprises a substantially rigid frame 10 having a plurality of relatively heavy resistance conductors of relatively small transverse area, for example wires 11 arranged thereacross. These wires are arranged in a cutting pattern and are insulated from the frame 10. As shown in Figs. 1 and 3, the wires are substantially parallel to each other and evenly spaced so as to cut blocks 12 of solid carbon dioxide into slabs.

In Fig. 5 there is shown one arrangement for fastening a wire 11 in the frame 10. The insulating means as shown comprises annular insulating members 13 held in openings in the frame 10. Extending through each pair of insulating members 13 are threaded rods 14 and 15. The ends of a resistance wire 11 are attached to these threaded rods. The rod 14 is provided with a nut 16 thereon bearing against the adjacent insulating member 14 and a second nut 17 bearing against the first nut 16, and serving as a lock nut. The opposite threaded rod 15 is somewhat longer than the rod 14 and is provided on its end with nuts 18 and 19. The outer nut 19 serves as a lock nut and bears against the inner nut 18. Between the nut 18 and the adjacent insulating member 13 is a relatively long heavy coil spring 20. This coil spring is of considerable strength so that the wire 11 will be maintained taut. Because of the relatively great length of the spring 20, it will maintain an approximately constant degree of tension on the wire 11 irrespective of the expansion and contraction thereof due to changes in the temperature of the wire and other causes.

Each wire 11 that is located in the rigid frame 10 is connected in electrical series with the adjacent wires by means of insulated leads 21. Each end wire 11 of the series is connected to a source of electric current through a lead wire 22 on the end opposite a lead wire 21.

The cutter shown in Figs. 2 and 4 comprises a substantially rigid frame 23 similar to the frame 10. This frame 23 is provided with two sets of resistance wires 24 and 25 with each wire being similar to the previously described wire 11. The wires 24 in one set are arranged substantially parallel to each other in the embodiment shown and the wires 25 in the other set are also arranged substantially parallel to each other. Each set of wires 24 and 25 are arranged at substantially right angles to each other and the wires in one set are spaced from those in the other set a distance that is greater than the greatest possible displacement of the wires caused by conditions of load, high temperature and the like. Each wire 24 and 25 is mounted in the rigid frame 23 in a manner similar to that previously described for the wires 11 and shown in detail in Fig. 5. The wires 24 and 25 are connected in electrical series in a manner similar to wires 11, but here the wires are connected by relatively stiff electrical conducting bands 26 located outside the frame 23. In the embodiment shown, the rigid frame 23 is mounted on four mounting members, such as legs, 27 by means of brackets 28 attached to the frame 23 adjacent the corners thereof. The legs 27 permit the cutter to be placed on a base member and provide a substantial space below the cutter, as shown in Fig. 2. The space below the cutter may be provided, if desired, with a container 29 for receiving the cubes of solid carbon dioxide.

The resistance conductors, for example wires 11, 24 and 25, may be of any type desired. In one embodiment of the invention these were "Nichrome V" wire, which is about 80% nickel and about 20% chromium. In this embodiment the wires 11 were about 0.05 inch in diameter while the wires 24 and 25 were about 0.064 inch in diameter. In choosing the diameter for the wire, it was found that although a smaller wire would cut at a faster rate, it was advisable to have a wire large enough to provide the required strength so as to withstand the pressure on the wire during the cutting operation.

The resistance wires are heated with electric current at a temperature that is preferably above the boiling point of carbon dioxide. Any voltage and amperage may be used so long as the wires are maintained at a sufficiently high temperature. In one embodiment of the invention the amperage through the wires was between approximately 24 and 26 amperes.

The spring tension that is applied to the wires is quite important as the springs must take the load resulting from the pressure applied to the wires and must be strong enough and long enough to apply an approximately equal tension to each wire irrespective of the temperature of the wire. In the embodiment shown, the tension on each wire is about 25 pounds. This tension is adjustable by means of the nuts that engage the threaded rods (Fig. 5). This feature is important as it permits the operator to compensate for creep in the wires.

In cutting a large block of the solid carbon dioxide into slabs, the cutter shown in Figs. 1 and 3 is placed on top of a block of the material as shown in Fig. 1 with the frame 10 located beyond the sides of the block 12 and the wires 11 resting on top of the block. As shown in Fig. 1, two blocks 12 of solid carbon dioxide may be arranged with one on top of the other. The wires 11 then bear against the top surface of the top block. When electric current is permitted to flow through the wires 11 they become heated and the weight of the cutter causes the wires to pass down through the solid carbon dioxide as indicated by the dotted lines 12a. As the wires become heated, they sublime the solid carbon dioxide at the points contacted by the wires. In a typical installation, the wires cut through the solid carbon dioxide at a speed of about one inch per minute.

After the slabs of solid carbon dioxide have been prepared they may be stored in an insulated cabinet until ready to be cut into cubes. When a slab is cut into cubes this slab 12b is placed on top of cutting wires 24 in the embodiment shown in Figs. 2 and 4. The wires 24 and 25 are also electrically heated and the weight of the slab 12b on first the wires 24 and then the wires 25 causes the slab to sink down around the wires and thus be cut into cubes. These cubes, in the embodiment shown in Fig. 2, fall into the container 29 that is below the cutter.

Although each cutter has been shown and described as having a plurality of wires arranged in a cutting pattern, it is believed obvious that any other arrangement may be used, if desired. The simplest cutter would be one which provided a rigid frame with a single wire stretched thereacross so that the wire could be forced through a block of solid carbon dioxide to cut it into any size portions desired. One or both of the cutters described herein could be arranged in conjunction with an insulated cabinet or other container, if desired.

The cutter of this invention permits the cutting of thinner pieces of solid carbon dioxide and avoids the relatively high waste and erratic cutting that is obtained with saws or other prior methods of cutting. In the present method of cutting, the solid carbon dioxide is pressed against a taut resistance wire that is electrically heated at a temperature preferably above the boiling point of carbon dioxide while the wire is maintained substantially taut. The solid carbon dioxide may be pressed against the wire either by forcing the wires against the material or by forcing the material against the wires.

Having described my invention as related to the embodiment shown in the accompanying drawings it is my intention that the invention be not limited by any of the details of description unless otherwise specified, but rather be construed broadly within its spirit and scope as set out in the accompanying claims.

I claim:

1. A cutter for solid carbon dioxide comprising a rigid frame, a plurality of electric resistance wires across said frame and insulated therefrom for supplying heat, and means for maintaining said wires taut, said cutter being relatively heavy to cause the wires to move down through said solid carbon dioxide at an appreciable speed under the force of gravity only, and said cutter having a low center of gravity that is adjacent the wires and substantially at the center of the cutter to aid in maintaining the cutter substantially level.

2. A cutter for solid carbon dioxide comprising a rigid frame, an electric resistance wire extending across the frame, each end of the wire being attached to the end of a rod member of relatively large diameter extending beyond the frame, an electrical lead attached to the outer end of each rod member to place the rod member in an electric circuit, means for maintaining the wire taut, and means for insulating each rod member from the frame.

3. A cutter for solid carbon dioxide comprising a rigid frame, a plurality of electric resistance wires extending across the frame, each end of each wire being attached to the end of a rod member of relatively large diameter extending beyond the frame, an electrical lead attached to the outer end of each rod member to place the rod member in an electric circuit, means for maintaining the wires taut, and means for insulating each rod member from the frame, said frame being of heavy construction with relation to the weight of the wire and located beyond the carbon dioxide during the cutting operation to aid in maintaining the cutter substantially level during said cutting operation, said cutter having a low center of gravity that is adjacent the wires and substantially at the center of the cutter to aid in maintaining the cutter substantially level.

LEE FOSTER.

REFERENCES CITED

The following references are of record in the file of this patent:

UNITED STATES PATENTS

| Number | Name | Date |
| --- | --- | --- |
| 1,250,010 | Pouchan | Dec. 11, 1917 |
| 1,709,709 | Brizzolara | Apr. 16, 1929 |
| 1,785,078 | Gibson | Dec. 16, 1930 |
| 2,004,580 | Meyer | June 11, 1935 |
| 2,156,832 | Ayers | May 2, 1939 |
| 2,165,573 | Pfeil | July 11, 1939 |
| 2,216,604 | Schwimmer | Oct. 1, 1940 |
| 2,300,699 | Perry | Nov. 3, 1942 |